T. McCORMICK.
PORTABLE SAW DEVICE.
APPLICATION FILED JULY 7, 1920.
1,388,186.
Patented Aug. 23, 1921.
2 SHEETS—SHEET 1.
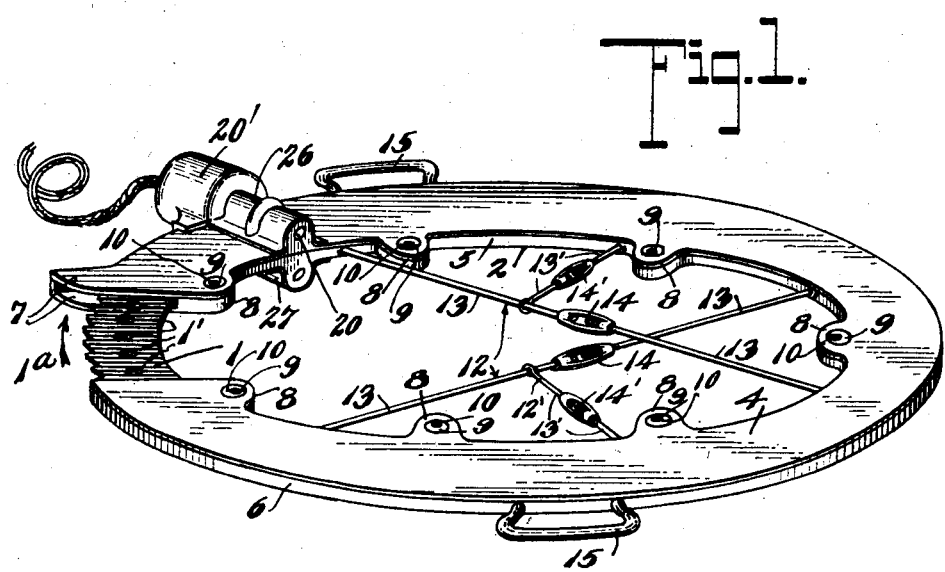
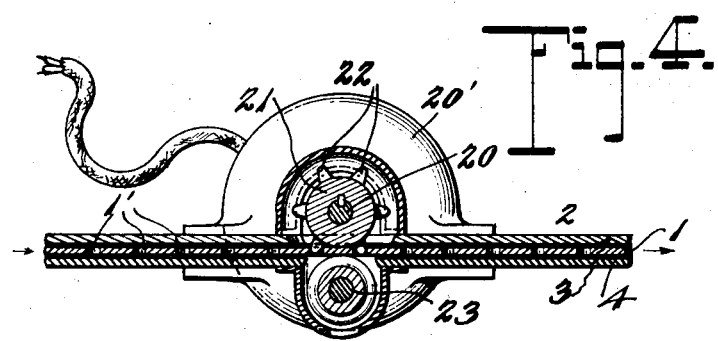
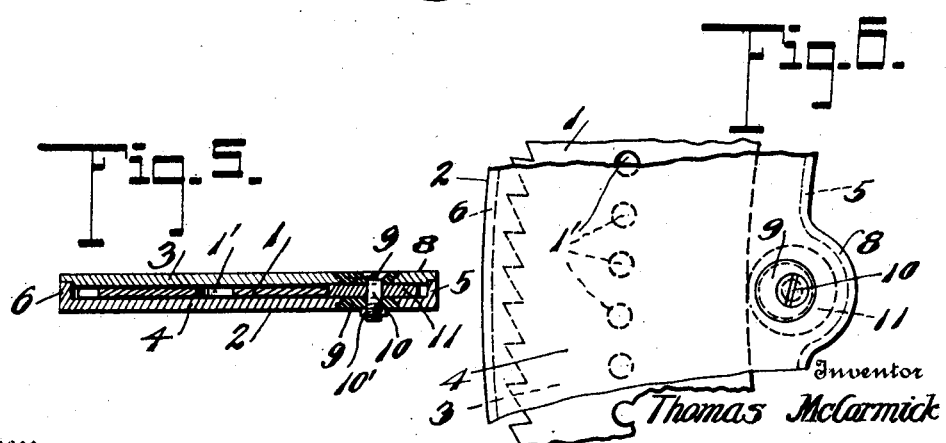
Witness
C.H.Wagner
Inventor
Thomas McCormick
By Robt Robt Hill
Attorneys T. McCORMICK.
PORTABLE SAW DEVICE.
APPLICATION FILED JULY 7, 1920.
1,388,186.
Patented Aug. 23, 1921.
2 SHEETS—SHEET 2.
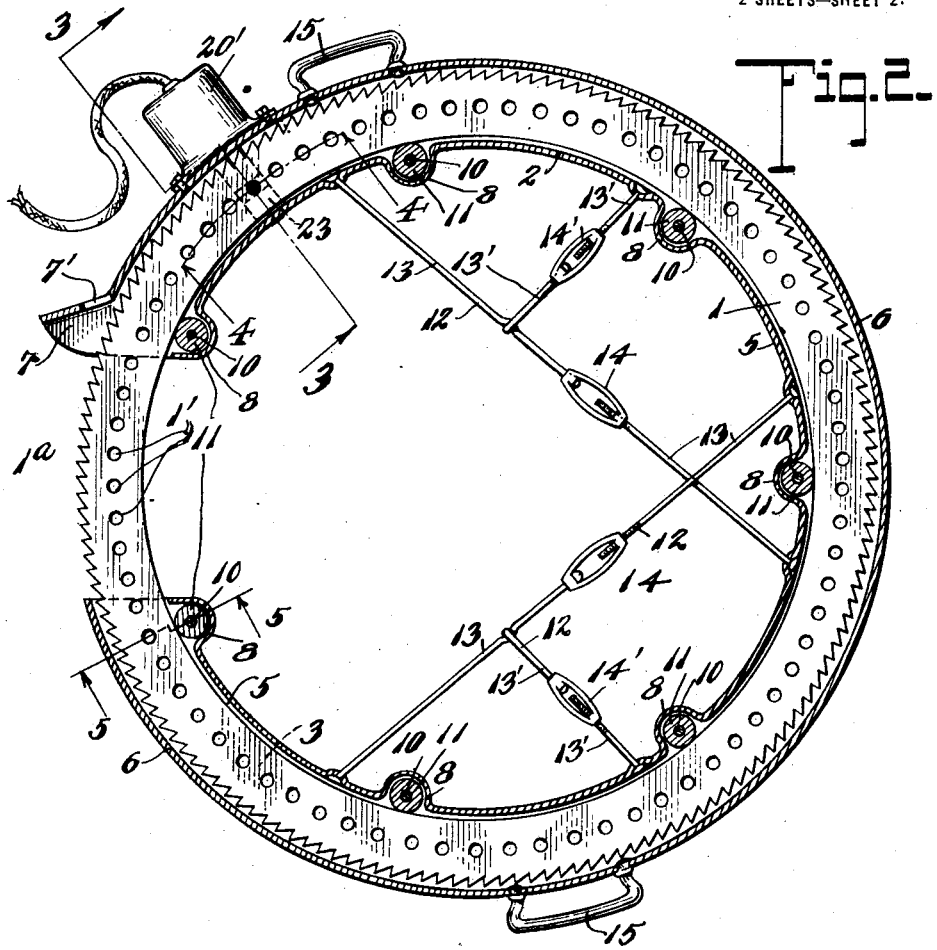
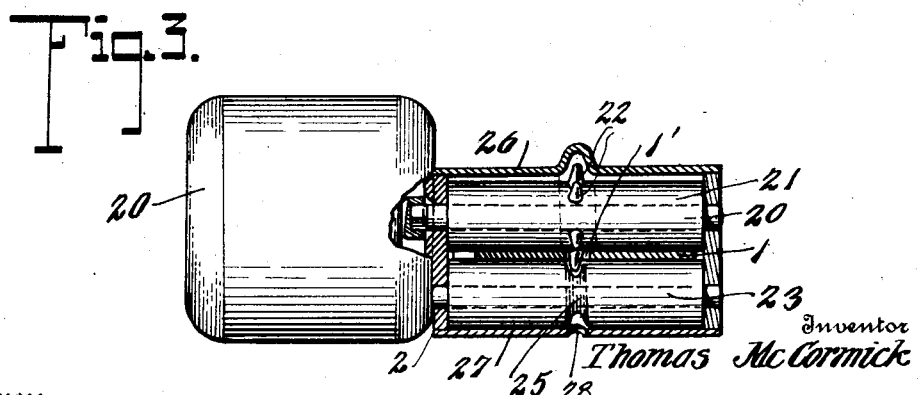
Witness
C. H. Wagner
Inventor
Thomas McCormick
By Robb, Robb & Hill
Attorneys

UNITED STATES PATENT OFFICE.

THOMAS McCORMICK, OF KLAMATH FALLS, OREGON.

PORTABLE-SAW DEVICE.

1,388,186. Specification of Letters Patent. Patented Aug. 23, 1921.

Application filed July 7, 1920. Serial No. 394,422.

*To all whom it may concern:*

Be it known that I, THOMAS McCORMICK, a citizen of the United States, residing at Klamath Falls, in the county of Klamath and State of Oregon, have invented certain new and useful Improvements in Portable-Saw Devices, of which the following is a specification.

My invention relates to improvements in saw devices, and more particularly to housings or frames for annular or ring saws.

The primary object of my invention is to produce a powder driven portable saw, capable of operating in any position and free from the cumbersomeness incident to operating saw members from or upon carriages or platforms.

At the same time it is an object of my invention to produce a saw requiring a minimum amount of human labor, and while light in structure and cheap of manufacture, of wide work capacity.

Other objects and desirable features will clearly appear in the specification which follows, and will be pointed out specifically in the claims hereto appended.

Referring now to the drawings in detail,

Figure 1 is a perspective view of the complete invention where an electric motor is used for operative power;

Fig. 2 is a horizontal section thereof;

Fig. 3 is a cross section of the saw and housing on the line 3—3 of Fig. 2;

Fig. 4 is an arcuate section of the saw and housing on the line 4—4 of Fig. 2;

Fig. 5 is a cross section of the saw and housing on the line 5—5 of Fig. 2; and

Fig. 6 is a fragmentary view showing roller bearing adjusting means.

Like characters of reference denote corresponding parts throughout the several views.

In the illustrations of my invention, numeral 1 represents an annular saw of any required width and thickness, provided with spaced perforations or apertures 1' therethrough, carrying on its outer rim cutting teeth.

Said saw is removably mounted in an arcuately shaped casing or housing 2 consisting of flat top and bottom plates 3 and 4, plate 4 having its edges 5 and 6 upturned to form a track between which the saw 1 travels. Between the ends of casing or housing 2 the working edge of the saw is exposed, this space being designated in the drawings as 1ª and is of such width as is suggested by the character of the work to be performed upon.

Plates 3 and 4 are provided with coinciding shoulders or projections 7 on their outer rim and numerous coinciding projections 8 on their inner side. Each of the latter is apertured to seat a shouldered circular disk or plate 9 through which bolt 10, fastened by nut 10' and forming the axis of revolution for roller bearing 11, passes off center, thus forming an eccentric adjustment for said roller bearing regulating its relation to the inner rim of saw 1. Between shoulders 7 is an aperture 7', the purpose of which will later appear.

Main braces 12, each consisting of arms 13 and turnbuckle 14, are attached at opposite ends to the casing or housing 2, and which casing or housing 2 is further strengthened by ancillary braces 12', each comprising arms 13' and turnbuckle 14' extending from housing 2 to main brace members 12. The arrangement of the main and ancillary braces is such that interference with the operativeness of the saw as it cuts its way is avoided without losing the support afforded by the brace members.

Casing or housing 2 may be supplied with handles 15 placed in such positions as the size of the saw and the character of the work it is expected to perform suggest.

On casing or housing 2 adjacent to space 1ª is journaled a revoluble shaft 20, capable of attachment to whatever motive means that may be provided, here an electric motor 20', also mounted on casing or housing 2. Said shaft consists of a roller surface 21 to engage the flat side of saw 1 and spaced teeth 22 to coöperate with perforations or apertures 1' therein, transmitting motion thereto and producing maximum pulling tension on the saw at a point nearest its working edge.

Immediately beneath and on an axis parallel to that of shaft 20, is journaled a roller bearing 23, the surface thereof engaging with the under flat surface of the saw 1. Said roller bearing is grooved at 25 to give teeth 22 full play. Shaft 20 and roller bearing 23 both may be provided with housings 26 and 27. The latter may be supplied with an aperture 28 for the discharge of sawdust and other waste carried into the device by perforations or apertures 1' and discharged therefrom when teeth 22 engage therewith.

Having shown the construction of my device I will now describe its operation. Power being supplied through shaft 20, by motor 20', the saw 1 is put in motion, being drawn in the direction indicated by the arrow in Fig. 1. Variations in the diameter of the saw from temperature changes, stretching or other causes are overcome, and such changes as are indicated by the varying character of the work may be made through positioning the plates or disks 9, the adjustment of which permits tightening or loosening of the roller bearings 11 with relation to the inner rim of saw 1. When it is desired to run this device, the shoulder or projection 7 is brought to bear against the object, said shoulder aiding in positioning the saw and absorbing the stress incident to the operation thereof. Saw dust and other waste is discharged through aperture 7' therein. The saw is either withdrawn as the tree falls, or in the event the saw entirely severs the trunk, it may be dropped over the stump, the brace members 12 and 12' being arranged not to interfere with encircling the tree trunk. Fallen trunks may be approached from any position desired.

Removal of the saw member 1, and of saw dust, and waste material drawn into the casing or housing 2 is accomplished by removing top plate 3, leaving the whole device open and accessible.

While the preferred embodiment of my invention has been illustrated and described, no restriction is necessarily made to the precise details of that construction, as changes, alterations and modifications within the scope of the claims may be resorted to when desired.

Having thus described my invention, what I claim as new and desire to secure by Letters Patent is:—

1. In a portable saw, the combination with an annular saw blade having its outer edge provided with cutting teeth, of a casing therefor comprising arcuate bottom and top plates provided with inner and outer edge walls spacing said plates to receive the saw blade therebetween, the operative portion of said saw blade being exposed between the ends of said casing, pairs of opposite projections extending radially inward from the inner edges of said plates and having alined circular openings therein, disks journaled in said openings, a bolt eccentrically mounted in the disks of each pair of projections, a guide roller journaled on each bolt between said plates and engaging the inner edge of said saw blade, said bolts constituting the means for securing said plates together and said guide rollers being adjustable radially with respect to said saw blade by rotating said disks, and means mounted on said casing for rotating said saw blade.

2. In a portable saw, the combination with an annular saw blade having its outer edge provided with cutting teeth, a casing forming an arcuate runway for said blade, the operative portion of said blade being exposed between the ends of said casing, means mounted on said casing for rotating said saw blade, a pair of adjustable main brace members connected at one end of the inner edge portion of said casing adjacent to and on opposite sides of the opening between its ends, said members crossing each other and connected at their opposite ends to the casing opposite the opening between its ends, and an adjustable auxiliary brace member extending at substantially right angles to each main brace member and having one end connected thereto and the other end connected to said casing.

In testimony whereof I affix my signature.

THOMAS McCORMICK.